June 23, 1925.
F. G. WOODS
1,543,142
BABY CARRIER FOR AUTOMOBILES
Filed Oct. 22, 1923
2 Sheets-Sheet 1
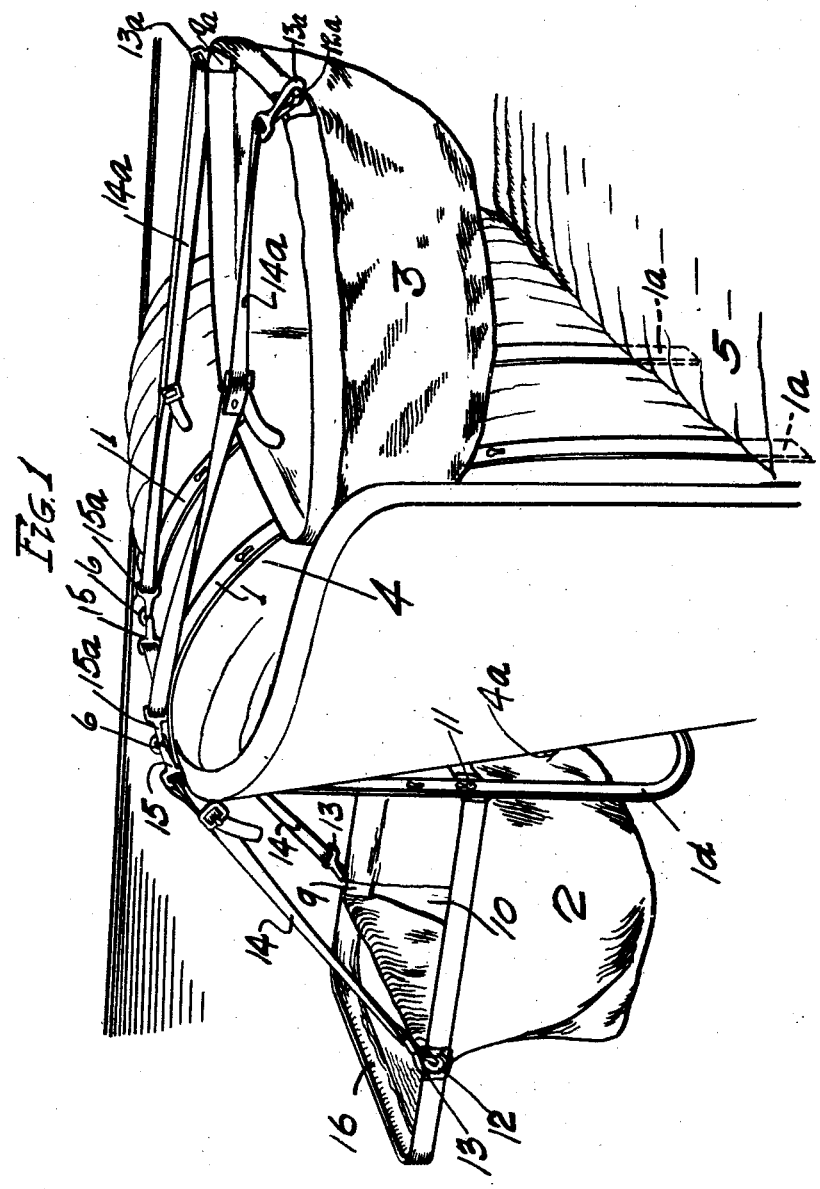
INVENTOR
Frank G. Woods
BY
J. H. Weatherford
ATTORNEY June 23, 1925.
F. G. WOODS
BABY CARRIER FOR AUTOMOBILES
Filed Oct. 22, 1923        2 Sheets-Sheet 2
1,543,142
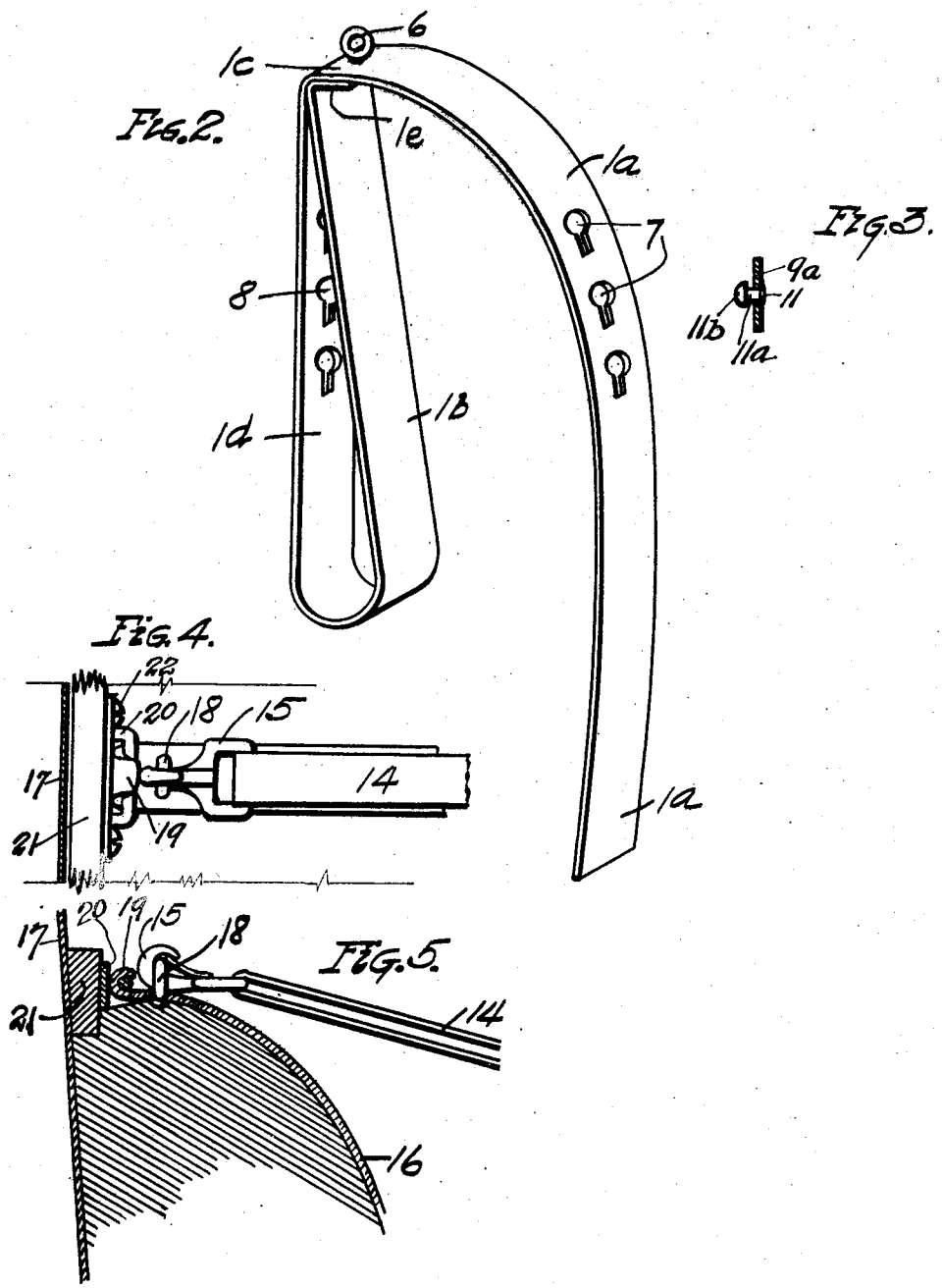
INVENTOR
Frank G. Woods
BY
J.H. Weatherford
ATTORNEY Patented June 23, 1925.

1,543,142

UNITED STATES PATENT OFFICE.

FRANK G. WOODS, OF MEMPHIS, TENNESSEE.

BABY CARRIER FOR AUTOMOBILES.

Application filed October 22, 1923. Serial No. 669,974.

*To all whom it may concern:*

Be it known that I, FRANK G. WOODS, a citizen of the United States, residing at Memphis, in the county of Shelby and State of Tennessee, have invented certain new and useful Improvements in Baby Carriers for Automobiles, of which the following is a full, clear, and exact description, such as will enable anyone skilled in the art to make and use the same.

My invention relates to a device to be attached to and detached from, the back of a seat of an automobile which will provide means for carrying a small child in front of the seat back or should it be used on the back of the front seat of an automobile, will provide means for carrying a child either in front of the back or behind the back; or if desired, in both places at the same time.

The objects of my invention are to provide such a device which may be easily attached to or removed from, an automobile and which will be simple in construction, strong and efficient.

I accomplish these objects as will be more fully hereinafter set out in the drawings, specifications and claims.

In the drawings,

Fig. 1 is a perspective view of my device attached to the back of the front seat of an automobile showing means provided to carry two children at the same time.

Fig. 2, is a perspective view of one of the attaching members with the width and thickness of the material of the member proportionally greatly increased over that to be used in order to more clearly show the details of construction.

Fig. 3, is a section of the frame bar of the carrying basket to show the means of attaching the same to the supporting member.

Figs. 4 and 5 show details of a modified means of attaching the device to the back of the rear seat of an automobile.

Referring now to the drawings in which the various parts are indicated by the same numerals in all the views, 1—1 are supporting members which are adapted to be slipped over the back of an automobile seat to support a basket 2 or a basket 3, or both.

The supporting member 1 is preferably a thin spring steel band about $\frac{1}{16}$ of an inch thick and $\frac{3}{4}$ of an inch wide, with the leg $1^a$ thereof shaped to conform to the contour of the front 4, and the leg $1^b$ shaped to conform to the rear $4^a$ of the back of the front seat. The leg $1^a$ is long enough to extend down behind the rear of the front seat 5 preferably to the extreme bottom of the same. Referring especially to Fig. 2, an idea may be formed of the shape of this member, the front leg $1^a$ of the same being curved as before stated to conform to the front contour of the seat back. At the upper end, this leg $1^a$ curves over into substantially a horizontal position and is then bent abruptly downward at $1^c$ to give a substantially vertical leg $1^d$. At the lower end this leg $d$ is bent forward and upward to form the member $1^b$ which conforms to the rear portion of the seat back. The upper end $1^e$ of this member is bent forward and is fastened to the upper end of the leg $1^a$ ordinarily by passing the shank of an eyelet 6 through the two members and riveting the lower portion of the shank. The leg $1^a$ of the supporting member is provided with a plurality of keyhole shaped slots 7 and the leg $1^d$ is similarly provided with a plurality of keyhole slots 8. The basket or seat for this device is preferably made of canvas depending from a metal rim or frame, the exact form of the canvas basket not being material to my invention. I have therefore shown in Fig. 1, two forms of the canvas portion of the basket. The basket 2 comprises a rectangular metal frame 9, only a minor portion of which can be exposed in the view, from which a canvas seat or basket 2 depends. The basket 2 is provided with leg holes 10 so that the child seated in the same may have its legs free and in case the basket is low enough may stand on the floor of the car, if hung as shown, or on the seat if hung from the front of the seat back. The metal frame 9 is provided at the back end with two rivets 11, each having a shank $11^a$ projecting from the metal frame 9 and a button head $11^b$ which is adapted to go through the upper portion of the keyhole slot 7 and which when dropped downward in the said slot effectually supports and locks the frame 9 to the leg $1^a$ or $1^d$ as the case may be. In Fig. 1, this particular basket is shown as engaging the leg $1^d$.

At the front end the frame 9 is provided with eyelets 12, with which snap hooks 13 may be engaged. From these hooks adjustable straps extend upward to similar snap hooks 15 which engage with the eyelets 6 on the members 1, thus providing a support for the front of the basket. If desired, the frame 9 may be extended forward and a shelf 16 be provided at the front of the basket. It will be noted that the entire metal frame including this extension is covered by canvas with the exception of the points at which the bottom head rivets 11 and the eyelet 12 project outward from it. At such points the metal frame is left bare in order that metal to metal contact may be had with the other members.

In Fig. 1, I also show a basket 3, which is made up of a similar metal frame 9ª, having similar button head rivets not visible in the views for attaching it to the members 1 and similar eyelets 12ª, snap hooks 13ª and 15ª and similar supporting straps 14ª. In using the device, two of the supporting members are slipped over the seat back the proper distance apart to register with the button head rivets on the back of the metal frame 9 or 9ª as the case may be and these rivets are hooked into the keyhole slots 7, use being made of that slot which is the desired height above the floor or seat, as the case may be. The straps 14 (or 14ª) are then placed and their lengths adjusted to hold the frame 9 or 9ª in a substantially horizontal position. The carrier is then ready for use. The type of basket 2 may be used either in the front or rear and likewise the type of basket 3 may be used in the front or the rear. It will also be noted that one basket may be used or two as may be desired.

In Figs. 4 and 5, I show a modification in which a modified means of attaching the supporting member 16 is used. In this case the seat back has a member 17 which precludes passing the supporting member over the back. The eyelets 18 are fastened into the upper portion of these supporting members 16, as in the former case, but the supporting members 16 are provided with some means of attaching them to such for instance as the hooks 19, which are adapted to engage with clips 20 which are secured to some portion of the top of the seat back such as the member 21, by screws 22. These supporting members 16 are otherwise identical in shape with the members 1ª, are similarly provided with keyhole slots and are adapted to be used with either of the baskets 2 or 3.

It will of course be distinctly understood that while I have given specific dimensions for a particular one of the supporting members, that I do not thereby intend in any way to limit myself to such dimensions as it is evident that they may be largely varied without departing in any way from my real invention, and are given for purposes of illustration only.

Having now fully described my invention, what I claim and desire to secure by Letters Patent of the United States is:—

1. A baby carrier for automobiles comprising supporting members spaceable apart to conform to the spacing of rivets in a seat frame, each member comprising a single piece extending upward from behind the automobile seat, conforming to the curvature of the front of the seat back, thence curving over the top thereof and extending vertically downward, thence looping inward against the rear of the seat back and extending upward along the same and secured to said vertical section, each of these supporting members having a plurality of corresponding keyhole slots in the front and back legs thereof, and each having an attaching member at the top thereof, of a basket, comprising a frame having a seat carried thereby, the said frame having button head rivets spaced apart projecting from the rear thereof and adapted to be engaged with one pair of said keyhole slots in the supporting member, and adjustable supporting straps extending from the front of said frame to the corresponding attaching members.

2. A baby carrier for automobiles comprising supporting members spaced apart to conform to the spacing of attaching means in a seat frame, each member having a plurality of attaching devices, and each having an attaching means at the top thereof, of a basket comprising a frame having a seat depending therefrom, the said frame having attaching means spaced apart at the rear thereof and adapted to be engaged each with any one of the said attaching devices in its conforming support, and adjustable supporting straps each extending from the front of said seat frame to the attaching means at the top of said corresponding supporting member.

3. A baby carrier for automobiles comprising supporting members spaceable apart to conform to the spacing of rivets in a seat frame, each supporting member having a plurality of corresponding keyhole slots in the front and back legs thereof, and an eyelet at the top thereof, of a basket, comprising a frame having a seat depending therefrom, the said frame having button head rivets spaced apart projecting from the rear thereof and adapted to be engaged each with any one of said keyhole slots in its conforming support, and adjustable supporting straps extending from the front of said frame to the corresponding eyelet.

In testimony whereof I have hereunto set my name.

FRANK G. WOODS.

Witnesses:
F. C. PEARSON,
J. H. WEATHERFORD.